United States Patent [19]

Hornbaker et al.

[11] 4,388,446

[45] Jun. 14, 1983

[54] POLYETHYLENE TEREPHTHALATE BLENDS

[75] Inventors: Edwin D. Hornbaker; Jesse D. Jones, both of Baton Rouge, La.

[73] Assignee: Ethyl Corporation, Richmond, Va.

[21] Appl. No.: 301,936

[22] Filed: Sep. 14, 1981

Related U.S. Application Data

[63] Continuation-in-part of Ser. No. 230,253, Jan. 30, 1981, abandoned, and a continuation-in-part of Ser. No. 191,359, Sep. 29, 1980, abandoned, which is a continuation-in-part of Ser. No. 162,067, Jun. 23, 1980, abandoned, said Ser. No. 230,253, is a continuation-in-part of Ser. No. 162,067, abandoned.

[51] Int. Cl.$^3$ .............................................. C08L 67/02
[52] U.S. Cl. ...................................... 525/175; 525/64; 525/73; 525/74; 525/88; 525/117; 525/166; 525/169; 525/174; 525/176; 524/173
[58] Field of Search .............. 525/169, 175, 176, 174, 525/64, 117, 173

[56] References Cited

U.S. PATENT DOCUMENTS

| | | | |
|---|---|---|---|
| 2,465,319 | 3/1949 | Whinfield et al. | 525/285 |
| 3,047,539 | 7/1962 | Pengilly | 525/285 |
| 3,563,847 | 2/1971 | Rye et al. | 525/165 |
| 3,644,574 | 2/1972 | Jackson, Jr. et al. | 525/175 |
| 3,840,499 | 10/1974 | DiGiulio | 525/285 |
| 4,122,130 | 10/1978 | Fava | 525/165 |

OTHER PUBLICATIONS

Kirk–Othmer, "Encyclopedia of Chemical Technology", 2nd Ed., vol. 16, pp. 159 et seq.

*Primary Examiner*—J. Ziegler
*Attorney, Agent, or Firm*—Donald L. Johnson; John F. Sieberth; Henry C. Jeanette

[57] ABSTRACT

Thermoplastic compositions comprising, in intimate admixture, 10 to 90 weight percent of polyethylene terephthalate and from 90 to 10 percent of a copolymer of a vinyl aromatic compound and an $\alpha,\beta$-unsaturated cyclic imide. These compositions display desirable thermal properties, particularly elevated heat deflection temperatures.

13 Claims, No Drawings

POLYETHYLENE TEREPHTHALATE BLENDS

REFERENCE TO RELATED APPLICATIONS

This is a continuation-in-part of prior copending application Ser. No. 230,253 filed Jan. 30, 1981 and 191,359 filed Sept. 29, 1980, application Ser. No. 230,253 being a continuation-in-part of application Ser. No. 162,067 filed June 23, 1980, and application Ser. No. 191,359 being a division of said application Ser. No. 162,067, all of said prior applications being now abandoned.

BACKGROUND

Polyethylene terephthalate (PET) has become an important raw material for production of moldings, film and fibers. Preparation of PET is described, inter alia, in Whinfiled et al, U.S. Pat. No. 2,465,319 and in Pengilly, U.S. Pat. No. 3,047,539, and in Kirk-Othmer, *Encyclopedia of Chemical Technology*, Second Edition, Vol. 16, pp. 159 et seq. (1968), all disclosures being incorporated herein by reference.

Many applications for injection and extrusion molded parts require heat resistance, and it is in such applications that PET manifests certain undesirable properties. Unreinforced PET has been of limited interest for making such parts due to its low HDT (Heat Deflection Temperature)—about 75° C. at 264 psi. HDT is a measure of an important thermal property of a thermoplastic material wherein a bar of the material, held in flexure under constant load (usually at 264 or 66 psi), deforms a specified amount and the temperature at which this specified deformation occurs is the HDT—see Billmeyer, *Textbook of Polymer Science*, p. 112, John Wiley and Sons, Inc. (1962).

SUMMARY OF THE INVENTION

The present invention provides a thermoplastic molding composition which comprises an intimate admixture of: (a) a polyethylene terephthalate and (b) a copolymer of a vinyl aromatic compound and an imide derivative of an ethylenically unsaturated dicarboxylic acid.

The blends of this invention have a heat deflection temperature of at least about 80° C., preferably above about 90° C., at 264 psi as measured by the ASTM procedure D 648-72. In still another preferred embodiment, the copolymer is a copolymer of a styrene, preferably styrene, and maleimide. A further aspect of this invention is that the copolymer may be a rubber-modified copolymer.

DETAILED DESCRIPTION OF THE INVENTION

The polyethylene terephthalate used herein is preferably homopolymeric PET. Halogenated PET can also be used and is normally formed by condensation of a mixture of a halogenated, preferably brominated, terephthalic acid (e.g., 2,5-dibromoterephthalic acid and 2,3,5,6-tetrabromoterephthalic acid) and terephthalic acid with ethylene glycol. Additionally, the polyethylene terephthalate used herein can also contain up to 10 mol percent, relative to the acid component, of radicals of other aromatic dicarboxylic acids such as, for example, phthalic acid, isophthalic acid, naphthalene-2,6-dicarboxylic acid, diphenyl-4,4'-dicarboxylic acid and the like as well as their halogenated counterparts. The copolymers can also contain up to 10 mol percent, relative to the glycol component, of radicals of other glycols such as, for example, propylene glycol, butylene glycol, dibromoneopentyl glycol, bis(2-hydroxyethyl) ether of tetrabromobisphenol A and tetrabromo-p-xylene glycol. See, for example, Kirk-Othmer, *Encyclopedia of Chemical Technology*, Second Edition, Vol. 16, pp. 161-173 (1968).

The polyethylene terephthalates used herein should be moldable (i.e., injection moldable or moldable by extrusion), and thus generally will have an intrinsic viscosity (I.V.) falling between about 0.25 and 1.5, and more usually between about 0.5 and 1.2, as measured at 25° C. using a solvent consisting of 60 percent by weight phenol and 40 percent by weight of tetrachloroethane. For best results the polyethylene terephthalate should have an I.V. (measured in the foregoing manner) in the range of 0.4 to 1.2, more preferably between 0.5 and 1.1, and for most injection molding applications polyethylene terephthalates in which the I.V. is in the range of 0.5 to 0.9 are deemed most desirable.

The amount of polyethylene terephthalate resin used in the blends of this invention preferably falls within the range of from about 10 to about 90 weight percent based on the total weight of resin in the blend and the amount of the unsaturated cyclic imide copolymer falls within the range of from about 90 to about 10 weight percent also based on the total weight of resin in the blend. In a particularly preferred embodiment the relative amounts of the PET and the copolymer fall within the range of from about 20 to about 80 and from about 80 to about 20 weight percent, respectively, the total being equal to 100. Most preferably the amounts used fall within the range of 30 to 70 and from 70 to 30 weight percent, respectively.

Vinyl aromatic compounds of component (b) can be derived from compounds of the formula:

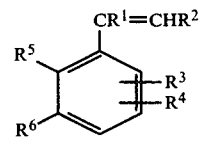

where $R^1$ and $R^2$ are selected from the group consisting of (lower) alkyl groups of from 1 to 6 carbon atoms and hydrogen; $R^3$ and $R^4$ are selected from the group consisting of chloro, bromo, hydrogen, and (lower) alkyl of from 1 to 6 carbon atoms; $R^5$ and $R^6$ are selected from the group consisting of hydrogen and (lower) alkyl groups of from 1 to 6 carbon atoms or $R^5$ and $R^6$ may be concatenated together with hydrocarbyl groups to form a naphthyl group. These compounds are free of any substituent that has a tertiary carbon atom. Stryene is the preferred vinyl aromatic compound.

The α,β-unsaturated cyclic imides of component (b) are preferably amine nitrogen derivatives of an ethylenically unsaturated dicarboxylic acid. For example, the term cyclic imide identifies imides having the formula:

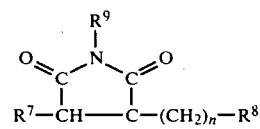

wherein the dotted lines represent a single or a double carbon-to-carbon bond, $R^7$ is selected from the group consisting of hydrogen, alkyl or aryl radicals containing up to 8 carbon atoms, $R^8$ is selected from the group consisting of hydrogen, vinyl, alkyl, alkenyl, alkylcarboxylic or alkenylcarboxylic of from 1 to 12 carbon atoms, $R^9$ is selected from the group consisting of hydrogen, lower alkyl, cycloalkyl or aryl and n is an integer of from 0 to 10. Examples include maleimide, methyl maleimide, dimethyl maleimide, N-methyl maleimide, phenylmaleimide and mixtures thereof. Maleimide is the preferred cyclic imide of component (b).

As pointed out in U.S. Pat. No. 3,840,499, the disclosure of which is incorporated herein by reference, copolymers of vinyl aryl monomers, such as styrene and the like, with imides of ethylenically unsaturated dicarboxylic acids, such as maleimide, can be prepared by direct copolymerization of the monomers. Such polymerization usually yields the 1:1 alternating copolymers although special techniques have been developed to prepare non-equimolar copolymers. The patent then describes in detail a more desirable way of forming the component (b) copolymers, viz., by directly reacting aqueous ammonia or amines at 125°–200° C. and under autogenous pressures of between 60 and 150 psi for 3 to 48 hours with an aqueous suspension of a copolymer containing an ethylenically unsaturated dicarboxylic acid, its anhydride, or a half acid derivative of the dicarboxylic acid and a vinyl aryl monomer copolymerized therewith. In conducting this reaction the ammonia or amines may be used in stoichiometric amounts based on the dicarboxylic acid moiety in the copolymer. However, to ensure complete conversion of the dicarboxylic acid moiety to the desired imide or N-substituted imide, an excess of the stoichiometric amount is used. Use of less than stoichiometric amounts of the amine make it possible to prepare terpolymers containing both the uncyclized dicarboxylic acid function and the imide function. Further heating in the open will completely cyclize the acid function to form the terpolymer containing the anhydride and the imide groups. Such terpolymers, preparation and illustrative examples of which are given in U.S. Pat. No. 3,840,499, are suitable for use in this invention and are included herein as component (b) copolymers.

Exemplary component (b) copolymers include thermoplastic copolymers composed of the following: styrene-maleimide, styrene-maleimide-maleic anhydride, styrene-N-methylmaleimide, styrene-N-methylmaleimide-maleic anhydride, styrene-N-butylmaleimide, styrene-N-butylmaleimide-maleic anhydride, 4-methylstyrene-maleimide, styrene-α-methylstyrene-maleimide, styrene-2,4-dichlorostyrenemaleimide-maleic anhydride, and the like.

Copolymers which comprise component (b) include rubber-modified copolymers. In preparing these rubber-modified copolymers use of such rubbers as polybutadiene, an isobutylene-isoprene copolymer, a styrene-butadiene copolymer, a butadiene-acrylonitrile copolymer, an ethylene-propylene copolymer, a polyisoprene, ethylene-propylene-diene monomer terpolymers (EPDM) and the like can be employed. In this connection see U.S. Pat. No. 3,998,907 which is incorporated herein by reference.

As set forth in U.S. Pat. No. 3,998,907 such rubber-modified copolymers can be prepared directly by reacting aqueous ammonia or amines at 125°–200° C. and under autogenous pressures of between 60 and 150 psi for 0.5 to 48 hours with a rubber-modified copolymer containing an ethylenically unsaturated dicarboxylic acid, its anhydride, or a half acid derivative of the dicarboxylic acid. The starting copolymers for the process comprise known copolymers of ethylenically unsaturated dicarboxylic acids, or their derivatives, with one or more copolymerizable vinyl aryl monomers, and are prepared by polymerizing a mixture of the monomers in the presence of the rubber. Examples IX, X, XI and XII of U.S. Pat. No. 3,998,907 illustrate the process.

Component (b) copolymers can comprise from 40 to 5 parts by weight of the α,β-unsaturated cyclic imide, from 60 to 95 parts by weight of a vinyl aromatic compound and from 0 to 50 parts by weight of rubber. Preferred polymers include those wherein the relative proportions of the vinyl aromatic compound and the imide fall within the range of from about 90 to about 70 weight percent and from about 10 to about 30 weight percent, respectively. Rubber-modified polymers used herein preferably contain about 5 to 25 parts by weight of the α,β-unsaturated cyclic imide, 40 to 85 parts by weight of the vinyl aromatic compound, and from about 5 parts to about 30 parts by weight of rubber. As noted above a portion, preferably a minor proportion, of the α,β-unsaturated cyclic imide may be replaced in the component (b) copolymers by the corresponding α,β-unsaturated cyclic anhydride.

Preferred component (b) copolymers are the styrene-maleimide and styrene-maleimide-maleic anhydride copolymers, both unmodified and in the form of rubber-modified graft copolymers.

A preferred unmodified vinyl aromatic α,β-unsaturated cyclic imide copolymer used in the compositions of this invention is Dylark ® DKB 176, supplied by ARCO/Polymers. Dylark ® DKB 176 is described as a styrene-maleimide copolymer containing about 17 percent maleimide, the balance being styrene. A preferred rubber-modified vinyl aromatic α,β-unsaturated cyclic imide copolymer is Dylark ® DKB 162 supplied by ARCO/Polymers. This has been described as a styrene-maleimide copolymer containing about 15 percent rubber and about 11 percent maleimide, with the balance being styrene. Chemical analysis of a sample of DKB 162 indicated that it contained about 10.1 percent maleimide and about 1.6 percent maleic anhydride.

Compositions of this invention can also include other ingredients, such as flame retardants, extenders, processing aids, pigments, stabilizers and the like, for their conventionally employed purposes. Reinforcing fillers, in amounts sufficient to impart reinforcement, can be used, such as carbon filaments; silicates, e.g., acicular calcium silicate; asbestos; titanium dioxide; potassium titanate; titanate whiskers; and glass flakes and fibers.

Particularly preferred compositions of this invention include those containing impact modifiers. Examples include ethylene/vinyl acetate copolymers, ethylene/acrylic acid copolymers (having some of the acid functions neutralized), ethylene/methacrylic acid copolymers (having some of the methacrylic acid functions neutralized), ethylene/alkyl acrylate/methacrylic acid terpolymer (also having some of the methacrylic acid functions neutralized), ABS, oxidized polyethylene, styrene-butadiene-styrene (S-B-S) block copolymers, styrene/butadiene multiblock copolymers, styrene/butadiene radial block copolymers, hydrogenated S-B-S block copolymers, styrene/butadiene rubber, acrylic rubbers, EPDM, ethylene/acrylic acid copolymers, ethylene/methyl acrylate copolymers, ethylene/ethyl acrylate copolymers, polyester-ether multiblock copolymers, and the like. These materials are available in a wide range of molecular weights and it is generally desirable that the impact modifier, when used, have a melt viscosity close to that of the substrate. Amounts of impact modifiers generally fall within the range of from about 5 to about 40 percent by weight. The results obtained in any given situation will, of course, depend upon a variety of factors such as the impact modifier selected, the manner by which it is compounded into the blends, the concentration in which it is employed, and indeed upon the criteria used in measuring or judging the toughness of the resultant blend.

For protection against thermo-oxidative degradation, the customary amounts of stabilizers, preferably 0.001 to 0.5 percent by weight, relative to the unfilled and unreinforced compositions of this invention, can be added to the compositions according to the invention. Examples of suitable stabilizers are phenols and phenol derivatives, preferably sterically hindered phenols which contain alkyl substituents with 1-6 carbon atoms in the two positions ortho to the phenolic hydroxyl groups, amines, preferably secondary arylamines and their derivatives, phosphates and phosphites, preferably the aryl derivatives thereof and quinones. Non-limiting examples include 4,4'-bis(2,6-di-tert-butylphenol); 1,3,5-trimethyl-2,4,6-tris(3,5-di-tert-butyl-4-hydroxybenzyl)-benzene; 4,4'-butylidene-bis-(6-tert-butyl-m-cresol); 3,5-di-tert-butyl-4-hydroxybenzyl-phosphonic acid diethyl ester; N,N'-bis-($\beta$-naphthyl)-p-phenylenediamine; N,N'-bis-(1-methyl-heptyl)-p-phenylenediamine; phenyl-$\beta$-naphthylamine; 4,4-bis-($\alpha,\alpha$-dimethylbenzyl)-diphenylamine; hydroquinone; p-benzoquinone; toluhydroquinone; p-tert-butylpyrocatechol; chloranil and naphthoquinone.

Flame-retarding additives which can be used for the compositions according to the invention comprise a large number of chemical compounds which are well known to those skilled in the art. In general, they contain chemical elements which are used because of their flame-retarding capacity, for example bromine, chlorine, antimony, phosphorus and nitrogen. Preferably, the flame-retarding additives are bromine and/or chlorine containing organic compounds (optionally used together with auxiliary compounds sometimes referred to as synergists, such as antimony trioxide, zinc borate, etc.) or elementary phosphorus or phosphorus compounds such as ammonium polyphosphate, various bromine and/or chlorine containing organic phosphate esters, hexaphenoxyphosphazene, and the like.

Preferred reinforcing fillers are glass fiber, mineral fillers, particulate fillers such as mica and the like. In general, optimum physical properties can be obtained if glass filaments are employed in amounts of from about 5 to about 40 percent by weight, based on the combined weight of glass and resin. However, higher amounts can be used.

Compositions of the invention may be prepared by blending the components in a mixer (e.g., a Henschel mixer) and compounding the mixture on an extruder (e.g., a twin-screw compounding extruder such as a 28 mm Werner-Pfleiderer extruder or the like). Thereafter, the extrudate is chopped into pellets and molded on an injection molding machine.

The present invention is further illustrated in the following examples, which are not to be construed as limiting. All parts are by weight.

EXAMPLES I–III

Compositions of the following Examples were prepared by mixing the components to form a premix, compounding the premix on a single screw extruder at temperatures of about 525° to 550° F. (274°–288° C.) and molding the pellets into test bars on a New Britain injection molding machine.

The particular materials used in these compositions were as follows:

a. Polyethylene terephthalate; from Goodyear Tire and Rubber Company; VFR 2977A-crystalline PET having an intrinsic viscosity of 0.68±0.025 as measured at 25° C. using a solvent consisting of 60 percent by weight phenol and 40 percent by weight of tetrachloroethane.

b. Rubber-modified styrene/maleimide copolymer; from ARCO/Polymers; Dylark® DKB 162—a rubber-modified graft styrene/maleimide copolymer indicated to contain 11 percent maleimide, 15 percent rubber, the balance being styrene, and which on chemical analysis was found to contain about 10.1 percent maleimide along with about 1.6 percent of maleic anhydride.

c. Styrene/maleimide copolymer; from ARCO/Polymers; Dylark® DKB 176 containing 17 percent maleimide, the balance being styrene.

The following tabulation shows the makeup of the blends (in parts or weight percentages):

|   | Components | Example I | Example II | Example III |
|---|---|---|---|---|
| a. | PET | 60 | 70 | 60 |
| b. | Rubber-modified Styrene/Maleimide | 40 | None | None |
| c. | Styrene/Maleimide | None | 30 | 40 |

Test bars of the above compositions were tested according to ASTM procedures to evaluate physical properties. The ASTM designation numbers for the properties measured were as follows: Specific Gravity—D 792-66 (1975); Tensile-Yield, Elongation and Tensile Elastic Modulus—D 638-77a; Flexural Strength and Flexural Elastic Modulus—D 790-71 (1978); Izod Impact—D 256-78; Heat Deflection Temperature—D 648-72 (1978); Vicat Softening Point—D 1525-76; and Rockwell Hardness—D 785-65 (1976). The results are shown in Table I.

TABLE I

| Property | Example I | Example II | Example III |
|---|---|---|---|
| Specific Gravity | 1.234 | 1.273 | 1.265 |
| Tensile-Yield, psi | 6720 | 4340 | 5150 |
| Elongation, % | 2.3 | 0.8 | 1.2 |
| Tensile Elastic Modulus, $10^3$ psi | 410 | 524 | 429 |
| Flexural Strength, psi | 11,600 | 9,800 | 9,240 |
| Flexural Elastic Modulus, $10^3$ psi | 418 | 529 | 497 |
| Izod Impact, ¼" bar, ft.-lb./in. | 0.4 | 0.2 | 0.3 |
| Izod Impact, ⅛" bar, ft.-lb./in. | 0.4 | 0.2 | 0.3 |
| Izod Impact, ⅛" bar, ft.-lb./in. (at −40° C.) | 0.4 | 0.2 | 0.2 |
| Heat Deflection Temperature at 264 psi, °C. | 93 | 98 | 101 |
| Heat Deflection Temperature at 66 psi, °C. | 131 | 154 | 145 |
| Vicat Softening Point, °C. | 220 | 226 | 207 |
| Rockwell Hardness, R Scale | 116 | 122 | 121 |

COMPARATIVE EXAMPLE

PET having an intrinisic viscosity of 0.59 as measured at 25° C. using a solvent consisting of 60 percent by weight phenol and 40 percent by weight of tetrachloroethane was molded in the manner outlined in Examples I–III. Physical property testing in accordance with the ASTM procedures of Examples I–III showed the neat PET to have an HDT of 76° 1 C. at 264 psi, an HDT of 104° C. at 66 psi, a ⅛" notched Izod Impact of 0.6 ft.-lb./in., a flexural strength of 15,200 psi and a flexural modulus of 400,000 psi.

EXAMPLE IV

Using the PET and rubber-modified maleimide copolymer as well as the blending and molding procedures of Example I, test bars were made from a blend composed of 30 parts of the maleimide copolymer and 70 parts of the PET. Table II lists typical properties of these test specimens.

TABLE II

| | |
|---|---|
| Flexural Strength, psi | 12,000 |
| Flexural Elastic Modulus, $10^3$ psi | 419 |
| Izod Impact, ⅛" bar, ft.-lb./in. | 0.5 |
| Heat Deflection Temperature at 264 psi, °C. | 86 |
| Heat Deflection Temperature at 66 psi, °C. | 124 |

EXAMPLES V–VIII

Four blends of this invention were prepared by extrusion compounding using an NRM extruder equipped with screen packs. Two of the blends were made by compounding the PET and maleimide copolymer in one pass through the extruder. The other two blends involved two passes through the extruder.

The PET used in these blends was obtained from American Hoechst Corporation and had an average intrinsic viscosity of about 0.6, a $TiO_2$ content of about 0.3 weight percent and a Gardner yellowness index of 12. It was normal fiber grade product. The maleimide copolymer used was the same rubber-modified product as used in Example I.

The ensuing tabulation identifies the blends, and Table III sets forth illustrative properties of test specimens molded therefrom.

| | Blend Identification | |
|---|---|---|
| Example | Parts of Maleimide Copolymer | Nature of Extruder Compounding |
| V | 30 | One Pass |
| VI | 45 | One Pass |
| VII | 30 | Two Passes |
| VIII | 45 | Two Passes |

TABLE III

Properties of the Blends

| | Examples | | | |
|---|---|---|---|---|
| | V | VI | VII | VIII |
| Flexural Strength, psi | 7930 | 8340 | 7560 | 7880 |
| Flexural Elastic Modulus, $10^3$ psi | 417 | 407 | 413 | 409 |
| Izod Impact, ⅛" bar, ft.-lb./in. | 0.2 | 0.2 | 0.3 | 0.3 |
| Heat Deflection Temperature at 264 psi, °C. | 90 | 103 | 86.3 | 93 |
| Heat Deflection Temperature at 66 psi, °C. | 130 | 134 | 136.8 | 132 |

Various modifications of the invention are possible without departing from the scope of the invention as set forth in the claims.

We claim:

1. A thermoplastic composition which comprises in intimate admixture:
   (a) a polyethylene terephthalate, and
   (b) a copolymer of a vinyl aromatic compound and an $\alpha,\beta$-unsaturated cyclic imide;
   said composition having a heat deflection temperature of at least about 80° C. at 264 psi as measured by the ASTM procedure D 648-72.

2. A composition of claim 1 having a heat deflection temperature of at least about 90° C. at 264 psi as measured by the ASTM procedure D 648-72.

3. A composition of claim 1 wherein (b) is a copolymer of a styrene and maleimide.

4. A composition of claim 1 wherein (b) is a copolymer of styrene and maleimide.

5. A composition of claim 1 wherein the relative proportions of the vinyl aromatic compound and the imide in said copolymer fall within the range of from about 90 to about 70 weight percent and from about 10 to about 30 weight percent, respectively.

6. A composition of claim 1 wherein the relative proportions of (a) and (b) fall within the range of from about 10 to about 90 weight percent of (a) with from about 90 to about 10 weight percent of (b), the total of (a) and (b) being equal to 100.

7. A composition of claim 1 wherein the relative proportions of (a) and (b) fall within the range of from about 20 to about 80 weight percent of (a) with from about 80 to about 20 weight percent of (b), the total of (a) and (b) being equal to 100.

8. A composition of claim 1 wherein said polyethylene terephthalate has an intrinsic viscosity of between about 0.5 and 1.2 as measured at 25° C. using a solvent consisting of 60 percent by weight phenol and 40 percent by weight of tetrachloroethane; wherein the relative proportions of the vinyl aromatic compound and the imide in said copolymer fall within the range of from about 90 to about 70 weight percent and from about 10 to about 30 weight percent, respectively; and wherein said composition has a heat deflection temperature of at least about 90° C. at 264 psi as measured by the ASTM procedure D 648-72.

9. A composition of claim 1 wherein said polyethylene terephthalate has an intrinsic viscosity of between about 0.5 and 1.2 as measured at 25° C. using a solvent consisting of 60 percent by weight phenol and 40 percent by weight of tetrachloroethane and wherein (b) consists essentially of styrene and maleimide.

10. A composition of claim 9 wherein the relative proportions of said styrene and said maleimide fall within the range of from about 90 to about 70 weight percent and from about 10 to about 30 percent, respectively.

11. A composition of claim 10 wherein the relative proportions of (a) and (b) fall within the range of from about 20 to about 80 weight percent of (a) with from about 80 to about 20 weight percent of (b), the total of (a) and (b) being equal to 100.

12. A thermoplastic composition which comprises in intimate admixture:
   (a) polyethylene terephthalate having an intrinsic viscosity of between about 0.4 and about 1.2 as measured at 25° C. using a solvent consisting of 60 percent by weight phenol and 40 percent by weight tetrachloroethane, and (b) a thermoplastic styrene-maleimide or styrene-maleimide-maleic anhydride copolymer;

said composition having a heat deflection temperature of at least about 80° C. at 264 psi as measured by the ASTM test procedure D 648-72, the relative proportions of (a) and (b) falling within the range of from about 30 to about 70 weight percent of (a) with from about 70 to about 30 weight percent of (b), the total of (a) and (b) being equal to 100.

13. A composition of claim 12 wherein said intrinsic viscosity of (a) is between about 0.5 and 0.9.

* * * * *